Figure 1:
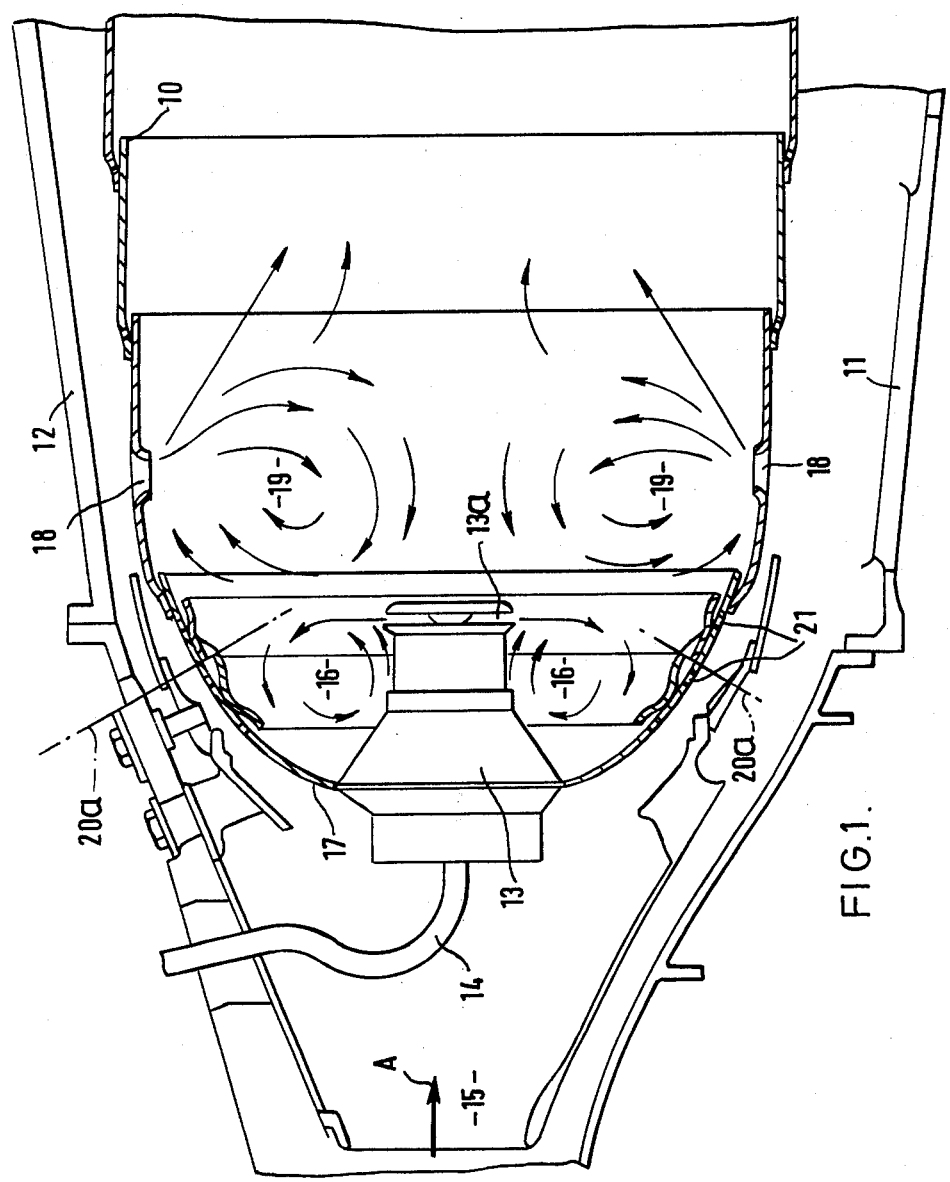

United States Patent [19]
Wood

[11] 3,898,797
[45] Aug. 12, 1975

[54] COOLING ARRANGEMENTS FOR DUCT WALLS

[75] Inventor: Robert David Wood, Etwall, England

[73] Assignee: Rolls-Royce Limited, London, England

[22] Filed: July 30, 1974

[21] Appl. No.: 493,154

[30] Foreign Application Priority Data
Aug. 16, 1973 United Kingdom............... 38812/73

[52] U.S. Cl. .................. 60/39.66; 138/38; 431/352
[51] Int. Cl.² ........................................... F02C 7/18
[58] Field of Search .......... 60/39.65, 39.66; 138/37, 138/38, 42; 431/352

[56] References Cited
UNITED STATES PATENTS

| | | |
|---|---|---|
| 2,699,648 | 1/1955 | Berkley............................ 60/39.66 |
| 3,430,443 | 3/1969 | Richardson et al................ 60/39.65 |
| 3,671,171 | 6/1972 | Doyle................................ 60/39.65 |
| 3,854,285 | 12/1974 | Stenger et al...................... 60/39.66 |

Primary Examiner—William L. Freeh
Assistant Examiner—Robert E. Garrett
Attorney, Agent, or Firm—Cushman, Darby & Cushman

[57] ABSTRACT

A wall structure, particularly for gas turbine engines combustion chambers, in which two vortices of opposite hard impinge on the wall and cooling films of opposite direction are required to be set up from the plane lying between the two vortices. The invention provides two rows of oppositely facing pockets having interdigitaded mouths which generate the two cooling films.

4 Claims, 4 Drawing Figures

3,898,797

COOLING ARRANGEMENTS FOR DUCT WALLS

This invention relates to a wall for a duct for conducting hot fluid and to an arrangement for cooling such a wall.

Arrangements are known for generating a film of cooling fluid on the inside of a wall of a hot duct to cool the wall and to prevent the hot fluid in the duct from coming into contact with the wall. One particular example of a hot duct is the combustion chamber of a gas turbine engine.

Generally, the combustion chamber wall is cooled by an air flow directed in the general direction of flow through the chamber. It is sometimes required to provide turbine engine combustion chambers with cooling air inlets which direct two cooling air flows into the chamber in directions which are substantially opposite. One of the disadvantages of prior art cooling air inlets of this type is that the inlet has at least one region over which a cooling air flow does not flow and this gives rise to cooling problems in this region.

It is an object of the present invention to provide a wall for a hot duct, particularly for the wall of a gas turbine engine combustion chamber, in which the area of this uncooled region is reduced to a minimum.

According to the present invention there is provided a wall structure for a hot duct which duct in use contains or conducts hot fluid and which has a cool fluid on the exterior thereof, the wall structure comprising a wall member, means formed on the inside of the wall member and defining first and second pluralities of discrete pockets, the wall member having at least one aperture for each pocket communicating said pocket with the exterior of the wall member to enable the introduction of the cool fluid into said pocket, each pocket having a mouth for discharging the introduced cool fluid, each mouth of the first plurality of discrete pockets being arranged to discharge said cool fluid substantially in a first direction along the interior of the wall to form a cooling film thereon, each mouth of the second plurality of discrete pockets being arranged to discharge said cool fluid substantially in a second direction along the interior of the wall to form a cooling film thereon, wherein said first and second directions are substantially mutually opposed and the mouths of the first plurality of discrete pockets are interdigitated with the mouths of the second plurality of discrete pockets so that substantially each mouth discharges cool fluid between two mouths of the other plurality.

Figure 2:
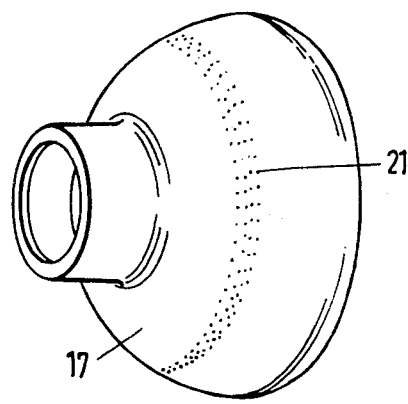
Figure 3:
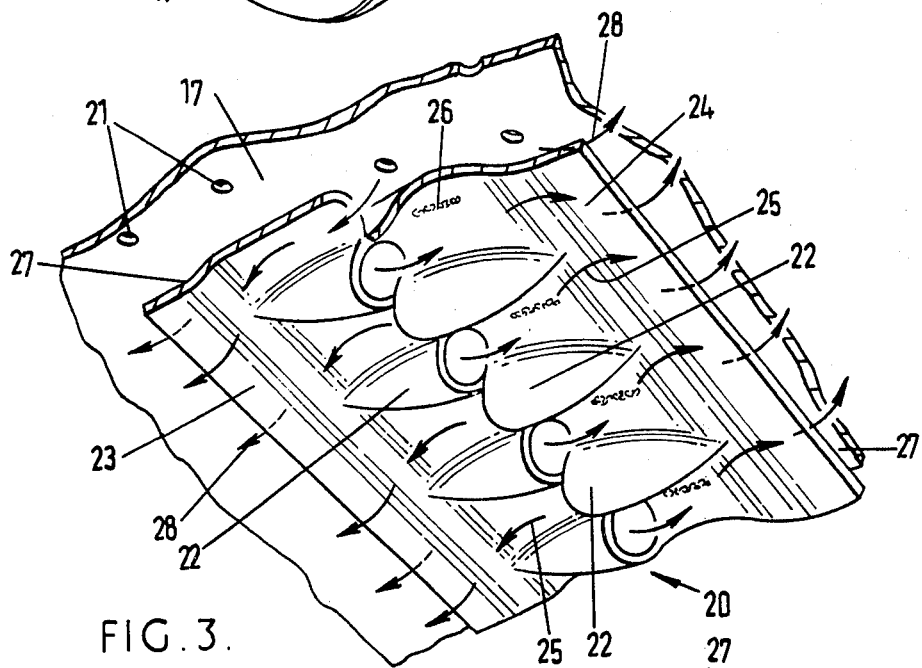
Figure 4:
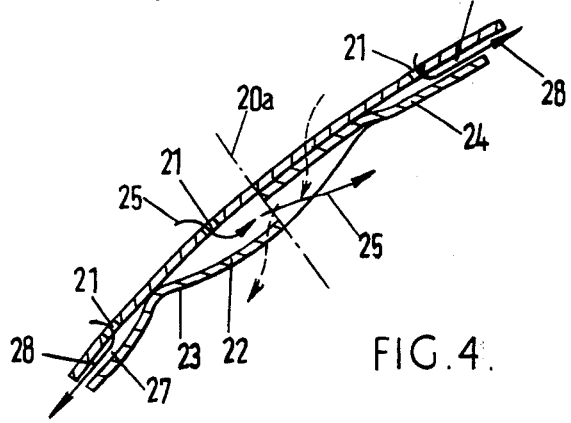

An embodiment of the invention will now be described, by way of example, with reference to the drawings accompanying the Provisional Specification, in which:

FIG. 1 is a longitudinal section through part of a gas turbine engine combustion chamber provided with a wall structure in accordance with the present invention, FIG. 2 is a perspective exterior view of the combustor head of the gas turbine engine combustion chamber shown in FIG. 1, FIG. 3 is an enlarge part perspective view of part of the wall structure of the gas turbine engine combustion chamber shown in FIG. 1, FIG. 4 is a section through the wall structure of the gas turbine engine combustion chamber shown in FIG. 3, to the same scale, With reference to FIG. 1, a gas turbine engine combustion chamber 10 is shown, which is one of a plurality of similar chambers disposed between the radially inner and outer annular walls 11 and 12 respectively of an air casing of a gas turbine engine. The remaining parts of the gas turbine engine are not illustrated but it will be understood that the engine includes a compressor delivering compressed air in the direction of arrow A into the combustion chamber 10 and that the products of combustion flow to the right, as shown in FIG. 1, to drive a turbine.

The chamber 10 includes a fuel burner 13 which is fed with a fuel via a fuel injector 14, mixes the fuel with compressed air delivered from the gas turbine engine compressor via the duct 15, and delivers the resultant fuel/air mixture into the combustion chamber 10 via an annular burner opening 13a. The burner 13 is adapted to deliver the fuel/air mixture in directions which are generally normal to the longitudinal axis of the burner 13 so as to produce a substantially toroidal fuel/air vortex 16. The vortex 16 circulates towards a combustor head 17 of chamber 10 and then back along the radially outer surface of the burner 13 towards the annular burner opening 13a.

A portion of the compressed air passing through the duct 15 is directed around the combustor head 17 of the combustion chamber 10 to enter the chamber via further air inlets 18 downstream of the combustor head 17. As the axes of the further air inlets 18 are approximately normal to the air flow passing thereover, the air which enters the inlets 18 is urged into a second substantially toroidal vortex 19. The vortex 19 lies immediately downstream of the first formed vortex 16 and is of the opposite hand to vortex 16. Some of the fuel discharged from the burner 13 becomes entrained in the vortex 19 in the region where the two vortices 16 and 19 impinge. An igniter (not shown) is provided for starting and sustaining combustion.

Thus two substantially toroidal fuel/air vortices 16 and 19 are formed in operation in the combustion chamber 10, thereby permitting staged combustion to take place, that is to say, the vortex 16 will be richer in fuel than the vortex 19 and whilst only partial combustion will occur in vortex 16 combustion will be completed as the mixture passes to vortex 19 and further along the chamber 10. The vortex 16, although too rich in fuel to allow complete combustion, will, nevertheless, support partial combustion and this requires the combustor head 17 to be cooled to prevent overheating and oxidation. Thus it is necessary for a flow of cooling air to be generated in a generally upstream direction inside the combustor head 17 and towards the burner 13 in the area where the vortex 16 impinges against the head 17, and for this flow to be in the same direction as the flow of vortex 16.

At the area where vortex 19 impinges against the wall of the combustion chamber a flow in the opposite direction is required and at the area where the junction between the two vortices 16 and 19 co-incides with the combustion chamber wall, a flow in two opposite directions is required from a plane 20a which is substantially perpendicular to the wall of the combustion chamber. In order to promote the flows in opposing directions away from plane 20a cooling air inlets 20 are provided on a combustor head 17. The cooling air inlets 20 are adapted to provide a film of cool air over the internal surface of the combustor head 17 which film does not oppose the flow of the fuel/air mixture contained in the vortices 16 and 19.

The cooling air inlets 20 (which can be more easily seen in FIG. 3), are in the form of pockets defined by corrugations 22 having mouths provided on the downstream edge of a first cooling strip 23 and on the upstream edge of a second cooling strip 24. Each corrugation 22 is supplied with cooling air via one of a plurality of aperatures 21 in the combustor head 17. The upstream edge of the cooling strip 24 abuts the downstream edge of the cooling strip 23.

The mouths of the corrugations 22 on the cooling strip 23 are off-set circumferentially so as to be interdigitated with the mouths of the corrugations 22 on the cooling strip 24 such that the cooling air is exhausted from the corrugations 22 in alternately upstream and downstream directions from the plane 20a in which the upstream edge of the cooling strip 24 and the downstream edge of the cooling strip 23 lie. The flow path of cooling air through one of the apertures 21 and its associated corrugation 22 is indicated by the arrows 25 in FIG. 4.

The cooling strips 23 and 24, which are attached to the combustor head 17 by spot welds 26, are offset at their upstream and downstream edges respectively so as to be spaced from the head 17 to define secondary cooling air inlets 27. The secondary cooling air inlets 27 are supplied with cooling air via some of the apertures 21 in the combustor head 17, the flow path of the cooling air being indicated by the arrow 28 shown in FIG. 4. Thus it will be seen that the cooling air films produced by the cooling air inlets 20 are augmented by the cooling air films produced by the secondary air inlets 27.

As the cooling air films flowing from each of the corrugations 22 on each cooling strip pass between the corrugations 22 on the other cooling strip, a protective film of cooling air is consequently present over a major portion of the exposed surface area of the cooling strips 23 and 24. In addition, the corrugations 22 are themselves cooled by conduction by the cooling air flows shown by arrows 25 passing through them. The cooling strips 23 and 24 have been described as though they are separate pieces. In practice they are fabricated from a single piece of metal.

Although the present invention has been described with reference to a combustion chamber of the type known as "cannular," it will be appreciated that the invention may be usefully exercised in an annular combustion chamber of the type in which at least one fuel/air flow path diverges upon impingement of the combustion chamber wall.

What I claim is:

1. A wall structure for a hot duct which duct in use contains or conducts hot fluid and which has a cool fluid on the exterior thereof, the wall structure comprising a wall member, means formed on the inside of the wall member and defining first and second pluralities of discrete pockets, the wall member having at least one aperture for each pocket communicating said pocket with the exterior of the wall member to enable the introduction of the cool fluid into said pocket, each pocket having a mouth for discharging the introduced cool fluid, each mouth of the first plurality of discrete pockets being arranged to discharge said cool fluid substantially in a first direction along the interior of the wall to form a cooling film thereon, each mouth of the second plurality of discrete pockets being arranged to discharge said cool fluid substantially in a second direction along the interior of a wall to form a cooling film thereon, wherein said first and second directions are substantially mutually opposed and the mouths of the first plurality of discrete pockets are interdigitated with the mouths of the second plurality of discrete pockets so that substantially each mouth discharges cool fluid between two mouths of the other plurality.

2. A wall structure according to claim 1, wherein the wall member and said mouths are so disposed that the cool fluid issuing from the mouths of the first plurality of discrete pockets forms a cooling film on the inside of the wall member extending in the first direction downstream of said mouths, and that the cool fluid issuing from the mouths of the second plurality of discrete pockets forms a cooling film on the inside of the wall member extending in the second direction downstream of said mouths.

3. A wall structure according to claim 2, comprising a single strip of material secured to the wall member and formed to define with the wall member both said pluralities of discrete pockets.

4. A wall structure according to claim 3 comprising a first extension of said strip extending in the first direction downstream of the mouths of said first plurality of discrete pockets, said strip having a first portion spaced from the wall member to form a first continuous recess having an open end facing in said first direction, said recess being in communication with the exterior of the wall, whereby the film of cool fluid from said first plurality of discrete pockets passes over said first extension of the cooling strip and cool fluid from said first continuous recess is joined therewith to enhance the cooling film formed on the inside of the wall member, and also comprising a second extension of said strip extending in the second direction downstream of the mouths of said second plurality of discrete pockets, said strip having a second portion spaced from the wall member to form a second continuous recess having an open end facing in said second direction, said recess being in communication with the exterior of the wall, whereby the film of cool fluid from said second plurality of discrete pockets passes over said second extension of the cooling strip and cool fluid from said second continuous recess is joined therewith to enhance the cooling film formed on the inside of the wall member.

* * * * *